Aug. 25, 1936.  F. C. FRANK  2,051,838

WHEEL

Filed June 29, 1932

INVENTOR.
FREDERICK C. FRANK
BY
ATTORNEY

Patented Aug. 25, 1936

2,051,838

UNITED STATES PATENT OFFICE 2,051,838

WHEEL

Frederick C. Frank, South Bend, Ind., assignor to Bendix Aviation Corporation, South Bend, Ind., a corporation of Delaware Application June 29, 1932, Serial No. 620,011

4 Claims. (Cl. 301—63)

This invention relates to wheels and more particularly to wheels for aircraft.

Broadly, the invention comprehends an exceedingly cheap and simple wheel designed primarily for use on planes having a relatively small gross weight.

The wheel including similar radial load-carrying disks arranged to support a relatively thin rolled sheet of metal rim, and retaining flanges for securing the rim to the disks including locking rings which completely fill spaces between the disks and the retaining flanges to present a continuous stream-line profile on the sides of the wheels thereby reducing the possibility of air currents building and creating parasitic drag.

The wheel houses a simple brake structure including a disk positioned in a recess in the face of one of the radial load-carrying disks of the wheel and means for actuating the disk to engage the radial load-carrying disk to effectively retard rotation of the wheel.

An object of the invention is to provide a wheel for aircraft comprising relatively few parts which may be easily and quickly assembled.

Another object of the invention is to provide a wheel for light aircraft comprising the minimum number of parts, and in which the amount of required machine operation on the parts during manufacture may be materially reduced.

A feature of the invention is a wheel for light aircraft including two similar castings, each comprising a hub portion and a radial load-carrying disk, the hub portions being assembled on a sleeve, the ends of which are turned to secure the hub portions together.

Other objects of the invention will appear from the following description taken in connection with the drawing, which forms a part of this specification, and in which.

Figure 1:
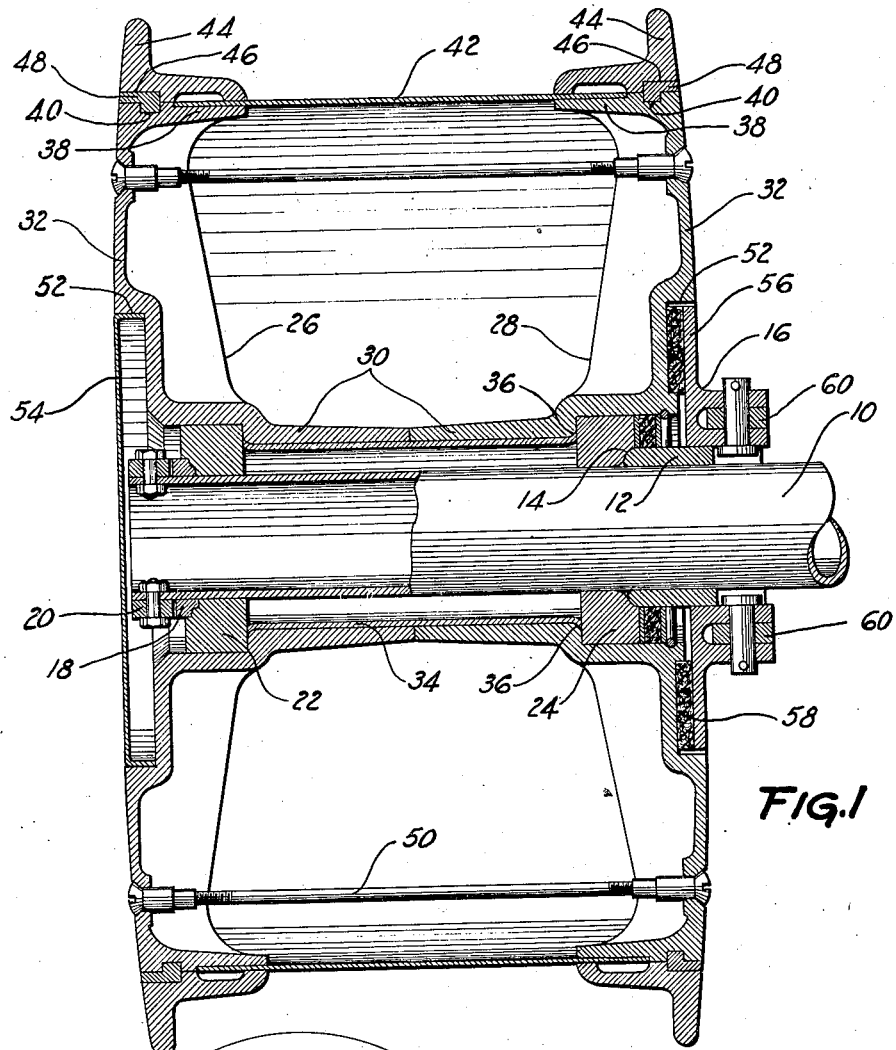
Figure 1 is a vertical sectional view of a wheel embodying the invention.
Figure 2:
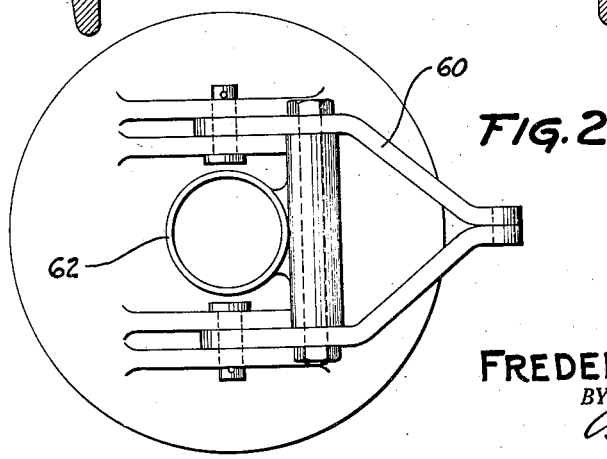
Figure 2 is a side elevation of the brake structure.

Referring to the drawing for more specific details of the invention, 10 represents an axle having secured thereto a sleeve 12 providing a suitable shoulder 14 and a support for a brake structure 16, to be hereinafter described. The axle has sleeved thereon a washer 18 secured against displacement by a retaining ring 20 bolted or otherwise secured in place. Positioned on the axle are suitable spaced bearings 22 and 24, one engaging the shoulder 14 on the sleeve 12 and the other engaging the washer 18. These races support the hub of the wheel.

The wheel comprises similar castings 26 and 28 each including a hub portion 30, and radial load-carrying disks 32. As shown, the hub portions are arranged in reverse position on a sleeve 34, the ends of which are turned as indicated at 36 to secure the hub portions together. Each of the radial load-carrying disks is provided with an inwardly extending flange 38 and circumferential groove 40. The flanges 38 support a relatively thin rolled sheet metal rim 42 and sleeved on the rim are retaining flanges 44. The retaining flanges are provided with annular shoulders 46 in which are seated retaining or locking rings 48 having portions engaging the circumferential grooves 40 in the flanges 38. The retaining rings completely fill the spaces between the retaining flanges and the radial load-carrying disks.

To more effectively secure the hub portions together and to retain the load-carrying disks in engagement with the respective edges of the rim stay rods 50 are connected between the radial load-carrying disks preferably adjacent the periphery of the wheel.

As shown, the radial load-carrying disks are provided with recesses or depressions 52, one of which has seated therein a disk 54 which effectively houses the end of the axle. The depression or recess in the other radial load-carrying disk houses an axially movable brake disk 56 having a frictional lining 58 adaptable for engagement with the radial load-carrying disk. The brake disk 56 is movable axially on the sleeve 12 to apply the brake by a yoke 60 pivoted on a bracket 62 suitably secured to the axle.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A wheel comprising two castings each having an outer disc portion, a hub portion, an inwardly extending flange portion on the outer edge of said disc portion, and an annular bearing recess in said hub portion adjacent the outer edge thereof, and a sleeve in the hub portions having its ends flared into said bearing recesses to hold said castings together.

2. A wheel comprising two castings each having a hub portion, a radial load carrying disc portion, and an inwardly extending annular flange portion on the periphery of said disc portion, said hub portion having an annular bearing recess therein adjacent the outer edge thereof, said disc portions having similar oppositely disposed depressions to receive a cover plate and a disc brake respectively, the disc surface within the brake depression being adapted to function as a brake disc, a sleeve in the hub portions having its ends flared in to said bearing recesses to hold said castings together, and a tubular rim secured on the inwardly extending flange of each of said disc portions between annular shoulders on said flanges.

3. A wheel comprising two castings, each having a hub portion, a radial load carrying disc portion, and an inwardly extending annular flange portion on the periphery of said disc portion, said hub portion having an annular bearing recess therein adjacent the outer edge thereof, said disc portions having similar oppositely disposed depressions to receive a cover plate and a disc brake respectively the disc surface within the brake depression being adapted to function as a brake disc, a sleeve in the hub portions having its ends flared in to said bearing recesses to hold said castings together, a tubular rim secured on the inwardly extending flange of each of said disc portions between annular shoulders on said disc portions between annular shoulders on said flanges, and tire retaining ring flanges detachably secured to said disc and flange portions and extending inwardly over said tubular rim.

4. A wheel comprising two castings each having an outer disc portion, a hub portion, an inwardly-extending flange portion on the outer edge of said disc portion, and a shoulder in each hub portion, and a sleeve in the hub portions having its ends flared around said shoulders to hold said castings together.

FREDERICK C. FRANK.